United States Patent Office 2,973,310
Patented Feb. 28, 1961

2,973,310
PROCESS FOR THE OXIDATION OF ORGANIC COMPOUNDS

Gordon Howard Whitfield, Norton-on-Tees, England, assignor to Imperial Chemical Industries Limited, London, England, a corporation of Great Britain No Drawing. Filed Oct. 25, 1957, Ser. No. 692,283
Claims priority, application Great Britain Nov. 16, 1956
11 Claims. (Cl. 204—158)

This invention relates to the oxidation of organic compounds.

According to the present invention hydrocarbons of aromatic character substituted by at least one $CH_3$, $CH_2R'$, or $CHR'R''$ group, R' and R" being alkyl, alicyclic, or aryl groups unsubstituted or substituted by alkyl groups, are oxidised to aromatic hydroperoxides in the liquid phase by means of molecular oxygen or ozone in the presence of not more than 5% by weight of free hydrobromic acid and in the presence of an alkaline stabiliser, the hydrobromic acid being calculated on the weight of the reaction mixture excluding stabiliser. Preferably the hydrobromic acid does not exceed 2% by weight of the total reaction mixture.

Examples of suitable alkaline stabilisers are the salts of a strong base and weak acid, especially an organic acid. Thus the acetates, propionates, benzoates, toluates, phosphates (other than the dihydrogen phosphates) of alkali metals or alkaline earth metals are suitable, e.g., sodium acetate, sodium benzoate, calcium carbonate, barium propionate. Preferably the pH is kept at 4 or above.

The hydrobromic acid may be introduced as such or may be produced in situ, for example by interaction of an aromatic or aliphatic acid and an alkali metal or alkaline earth bromide. Carboxylic acid may be formed as a by-product during the course of the oxidation.

Thus cumene may be oxidised to cumene hydroperoxide employing, e.g., 1% by weight each of benzoic acid and sodium bromide. The sodium benzoate formed acts as a stabiliser for the cumene hydroperoxide. Other stabilisers such as sodium carbonate may also be present.

The process can be applied to starting materials comprising methyl aromatic and aromatic heterocyclic compounds generally and also to both such compounds having the substituents —$CH_2R'$, and

especially the last mentioned.

Examples of starting materials to which the invention may be applied are the di-isopropyl benzenes which yield the corresponding di-isopropyl benzene mono- and di-hydroperoxides; tetralin which yields alpha-tetralyl hydroperoxide; sec.butyl-benzene which yields sec.butyl-benzene mono-hydroperoxide; di-sec.butyl-benzene which yields the corresponding mono- and di-hydroperoxides; ethyl benzene, which yields ethyl benzene mono-hydroperoxide; cyclohexyl benzene which yields the mono-hydroperoxide; dicyclo-hexyl benzene which yields the mono- and di-hydroperoxides; triphenyl methane which yields triphenyl methane mono- hydroperoxide; alpha-isopropyl pyridine which yields the mono-hydroperoxide.

If desired the following aids to peroxidation may be used, ultra violet light or ultra violet light plus free radical initiators such as benzoyl peroxide and azo-di-isobutyronitrile.

If desired a solvent may be present. Examples of suitable solvents are: lower aliphatic carboxylic acids; aromatic hydrocarbons; halobenzenes, e.g., ortho-dichlorbenzene; aromatic carboxylic acids; and water; or homogeneous mixtures of these.

Frequently the dihydroperoxide is a solid and can be separated by filtration, followed by washing with the starting material. When the hydroperoxide is soluble in the medium it can be obtained by, for example, treating the mixture with aqueous alkali, e.g., caustic soda to obtain the sodium salt, filtering this off, springing with carbon dioxide and washing with a hydrocarbon.

Temperatures of from 50° to 150° C., are suitable. The process may be conducted at atmospheric, or superatmospheric pressure up to 50 atmospheres gauge.

Example 200 grams of cumene, 2 grams of benzoic acid, and 2 grams of powdered sodium bromide were introduced into a glass reactor provided with a high speed cruciform stirrer with a hollow shaft. Air at a flow rate of 20 litres/hour was introduced through the shaft of the stirrer and the liquid was maintained at 90° C. At intervals samples of the liquid were withdrawn and its cumene hydroperoxide content was determined by titration with normal acidified potassium iodide solution and normal sodium thiosulphate. After 18 hours a concentration of cumene hydroperoxide of 40.9% by weight had been reached and the oxidation was still yielding the hydroperoxide at a rate of about 3% by weight per hour.

For purposes of comparison the procedure was repeated in the absence of bromide using the following sole additives with the results shown.

| Additive, percent by weight | Amount per 100 gms. | Time of reaction (hours) | Concentration of cumene hydroperoxide in the reaction liquid, percent by weight |
|---|---|---|---|
| Sodium benzoate | 2 | 19 | 18.9 |
| Benzoic acid | 1 | 20.3 | 22.9 |
| Sodium carbonate | 1 | 23.7 | |
| Sodium stearate | 1 | | 31.7 |

The beneficial results of the process of the present invention are evident in the increased pass yield of the cumene hydroperoxide.

I claim:

1. A process for the production of aromatic hyroperoxides from an aromatic hydrocarbon selected from the group consisting of cumene, diisopropyl benzene, tetralin, sec.-butyl-benzene, ethylbenzene, cyclohexylbenzene, dicyclohexylbenzene, and triphenylmethane, which comprises contacting said aromatic hydrocarbon in the liquid phase at a temperature of 50° to 150° C. and a pressure from atmospheric up to 50 atmospheres with an oxygen-containing gas in the presence of at most about 5% by weight of free hydrobromic acid and a weakly alkaline stabilizer to maintain the pH at at least 4, said alkaline stabilizer comprising the salt of a strong base and a weak acid.

2. The process of claim 1, wherein said alkaline stabilizer is selected from the group consisting of alkali and alkaline earth metal salts of a lower alkanoic acid, a mono-cyclic aromatic carboxylic acid, and phosphoric acid.

3. Process as claimed in claim 1 in which the proportion of free hydrobromic acid calculated as aforesaid does not exceed 2% by weight.

4. Process as claimed in claim 1 in which the weak acid is an organic carboxylic acid.

5. Process as claimed in claim 1 in which the strong base comprises alkali metal.

6. Process as claimed in claim 1 in which the starting material is a di-isopropylbenzene and the corresponding mono- and di-hydroperoxides are produced.

7. Process as claimed in claim 1 in which the starting material is cumene and cumene hydroperoxide is produced.

8. Process as claimed in claim 1 in which the starting material is sec.butyl benzene and sec.butyl benzene hydroperoxide is produced.

9. Process as claimed in claim 1 in which the starting material is cyclohexyl benzene and cyclohexyl benzene hydroperoxide is produced.

10. Process as claimed in claim 1 when assisted by the application of ultra violet light and with a free radical initiator present.

11. A process as claimed in claim 1 in which the oxidising gas is oxygen.

References Cited in the file of this patent

UNITED STATES PATENTS

| | | |
|---|---|---|
| 2,430,864 | Farkas et al. | Nov. 18, 1947 |
| 2,434,888 | Rust et al. | Jan. 20, 1948 |
| 2,435,763 | Vaughan et al. | Feb. 10, 1948 |
| 2,730,550 | Fortuin et al. | Jan. 10, 1956 |
| 2,827,493 | Rindtorff et al. | Mar. 18, 1958 |